No. 711,212. Patented Oct. 14, 1902.
W. H. HONISS.
JAR SEALING APPARATUS.
(Application filed Jan. 5, 1901.)
(No Model.)
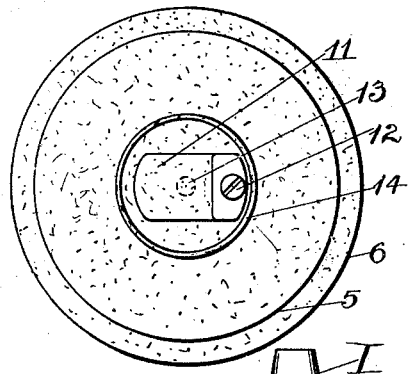
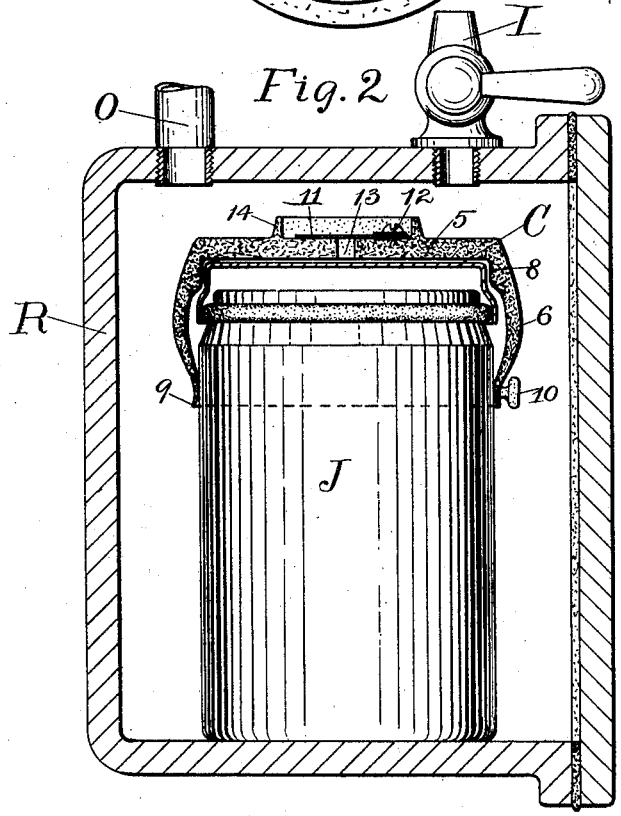
Witnesses:
Joseph Merritt
Nellie Phoenix
Inventor:
W. H. Honiss.

UNITED STATES PATENT OFFICE.

WILLIAM H. HONISS, OF HARTFORD, CONNECTICUT, ASSIGNOR OF THREE-FOURTHS TO BEECH-NUT PACKING COMPANY, OF CANAJOHARIE, NEW YORK, A CORPORATION OF NEW YORK, AND WILLIAM A. LORENZ, OF HARTFORD, CONNECTICUT.

JAR-SEALING APPARATUS.

SPECIFICATION forming part of Letters Patent No. 711,212, dated October 14, 1902.

Application filed January 5, 1901. Serial No. 42,178. (No model.)

*To all whom it may concern:*

Be it known that I, WILLIAM H. HONISS, a citizen of the United States of America, and a resident of Hartford, in the county of Hartford and State of Connecticut, have invented certain new and useful Improvements in Jar-Sealing Apparatus, of which the following is a specification.

This invention relates to an improved apparatus for hermetically sealing jars and other receptacles.

Figure 1 is a plan view of this improved apparatus; and Fig. 2 is a central vertical section thereof and shows the apparatus and a jar within a receiver, in which it is placed for the exhausting and sealing operation.

As is usual in vessels of this class, the sealing is accomplished by a cap closing against a gasket of rubber or other suitable material. In order to allow of the air being exhausted easily from the interior of the jar, it is desirable to place the caps lightly upon their gaskets instead of forcing them down, and while in this condition it often happens that the space between the jar and the cap is not entirely closed in all places on account of the irregularities and inequalities in the vessels, the gaskets, or the caps. The openings thus left, although favorable for the free passage of the air from the vessel, are liable to allow the readmitted air to enter before the atmospheric pressure has forced the caps against their gaskets with sufficient force to close those openings. Moreover, the caps thus loosely and irregularly supported upon the higher or larger portions of the gasket are liable to become tilted, so that they do not finally bear with a uniform pressure around the gasket even if subsequently forced down by the readmitted atmospheric pressure sufficiently to seal the vessel for the time being and are therefore liable sooner or later to become unseated, and thus allow the contents to be spoiled by contact with air.

It is the object of this invention to provide an apparatus which allows the jar-caps to rest lightly upon their gaskets during the exhausting operation and which is operated by the pressure of the readmitted air to force the caps down automatically and squarely upon their gaskets, and thus seal the jars without admitting air to the interior of the vessel.

This apparatus consists of a presser-cap 5, which extends downwardly over and past the cap of the jar and in this preferred construction has an annular seat 8 adjacent to the cap C, which tends to centralize said cap. The lower edge of the rim 6 terminates in a flexible elastic edge 9, which clasps the jar in a substantially air-tight manner. To this edge is attached a button 10, whereby the flexible edge may be lifted to allow the readmitted air to enter the interior of the apparatus after the jar is sealed. The presser-cap 5 is also provided with a return check-valve closing the orifice 13 and is here shown as a clapper-valve 11, made of some light flexible material and secured to the presser-cap 5 by the screw 12. This valve 11 is protected by an inclosing rim 14, attached to the cap 5. If the edge 9 is made sufficiently elastic, it may perform the functions of a check-valve, thus dispensing with the valve 11.

In employing this apparatus the jar-cap is seated on its gasket and the presser-cap 5 is pushed down far enough to bring it either lightly against or near enough to the jar-cap to prevent the latter from tilting if it should be lifted while the air is being exhausted from the vessel. The apparatus thus prepared is placed within the receiver R, which has an outlet or exhaust pipe O and an inlet-valve I. During the exhausting operation the air passes freely from the jar J between its cap and gasket and through the return check-valve. When a suitable vacuum has been produced, air is admitted through the inlet-valve I and operates to force the presser-cap downwardly, which in turn forces the jar-cap hard down and air-tight on its gasket. The flexible lip of the presser-cap is then lifted by the button 10, admitting air to the interior of the presser-cap, thus equalizing the pressure on both sides of said cap and allowing it to be removed.

The jars to be sealed may be inverted or be placed on their sides where the nature of their contents permits, and the entire apparatus may also be modified as to construction and arrangement in many ways which will suggest themselves to those skilled in the art to suit other conditions of service.

I claim as my invention—

1. A jar-sealing device for jars having hermetically-sealed caps or covers, comprising an exhausting-receiver, a temporary removable leveling and sealing cap for the permanent jar-caps, having a flexible edge for clasping the jar below the permanent cap, and inclosing that cap and the mouth of the jar, with means, as a return check-valve for permitting the exhaustion of the air from the interior of the sealing-cap and jar, and for automatically preventing the readmission of the air to the interior of the sealing-cap.

2. A jar-sealing device for jars having hermetically-sealed caps or covers, comprising an exhausting-receiver, a temporary removable leveling and sealing cap for the permanent jar-caps, having a flexible edge for clasping the jar below the permanent cap, and inclosing that cap and the mouth of the jar, means for exhausting the air from the interior and exterior of the sealing-cap, and means for readmitting air-pressure to the exterior of the sealing-cap whereby that pressure automatically forces the jar-cap upon the jar.

3. A jar-sealing device for jars having hermetically-sealed caps or covers, comprising an exhausting-receiver, a temporary removable leveling and sealing cap for the permanent jar-caps, having a flexible edge for clasping the jar below the permanent cap, and inclosing that cap and the mouth of the jar, means for exhausting the air from the interior of the sealing-cap, and means for readmitting air-pressure to the exterior of the sealing-cap, whereby that pressure automatically forces the jar-cap upon the jar, the elastic rim of the sealing-cap serving to inclose the mouth of the jar and forming a return check-valve to permit the exhaustion of the air from the interior of the sealing-cap and jar, and for automatically preventing the readmission of the air to the interior of the sealing-cap.

Signed at Hartford, Connecticut, this 29th day of December, 1900.

WM. H. HONISS.

Witnesses:
  JOS. MERRITT,
  WILLIAM A. LORENZ.